(12) United States Patent
Kobata et al.

(10) Patent No.: US 6,170,065 B1
(45) Date of Patent: *Jan. 2, 2001

(54) AUTOMATIC SYSTEM FOR DYNAMIC DIAGNOSIS AND REPAIR OF COMPUTER CONFIGURATIONS

(75) Inventors: Hiroshi Kobata, Watertown; Robert A. Gagne, Jr., Quincy; Theodore C. Tonchev, Cambridge, all of MA (US)

(73) Assignee: e-Parcel, LLC, Newtown, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/970,983

(22) Filed: Nov. 14, 1997

(51) Int. Cl.⁷ ............................ H02H 3/05; H03K 19/003
(52) U.S. Cl. ..................................... 714/7; 714/38; 714/46
(58) Field of Search ........................ 395/182.05, 182.02, 395/183.07, 183.14, 183.22, 200.33, 200.47, 200.49, 200.51, 200.53, 200.54, 200.55; 714/7, 4, 31, 38, 46; 709/203, 217, 219, 224, 225

(56) References Cited

U.S. PATENT DOCUMENTS

| | | |
|---|---|---|
| 5,307,490 | 4/1994 | Davidson et al. . |
| 5,471,615 * | 11/1995 | Amatsu et al. ................. 395/200.03 |
| 5,504,892 * | 4/1996 | Atsatt et al. ........................ 395/600 |
| 5,666,534 | 9/1997 | Gilbert et al. . |
| 5,689,726 * | 11/1997 | Lin ....................................... 395/830 |
| 5,732,219 * | 3/1998 | Blumer et al. .................. 395/200.57 |
| 5,740,431 * | 4/1998 | Rail ...................................... 707/200 |
| 5,742,829 * | 4/1998 | Davis et al. ......................... 395/712 |
| 5,745,738 * | 4/1998 | Ricard ............................. 395/500.34 |
| 5,774,644 * | 6/1998 | McKinstry ...................... 395/783.01 |
| 5,812,779 * | 9/1998 | Ciscon et al. ................... 395/200.53 |
| 5,815,652 | 9/1998 | Ote et al. . |
| 5,920,873 * | 7/1999 | Huben et al. ........................ 707/202 |

* cited by examiner

Primary Examiner—Dieu-Minh T. Le
(74) Attorney, Agent, or Firm—Daly, Crowley,& Mofford, LLP

(57) ABSTRACT

An automatic system is provided for dynamic diagnosis and repair of a user's computer through the utilization of a programmable interface to access and use relevant data in which a special script comprising a relatively small program first makes an inventory of hardware, software and configuration information relative to the user, his equipment and the network and stores this information in a single uniform object oriented database. A large number of system tools are also stored so that upon accessing the inventory and looking at any relevant data the script can call the available tools to automatically correct any user problem, whether it be compatibility of peripherals, software conflicts, providing missing software components, or correcting other problems, all on an automatic basis without user intervention or oftentimes without user knowledge.

19 Claims, 6 Drawing Sheets

Microfiche Appendix Included
(3 Microfiche, 227 Pages)

LANGUAGE GRAMMAR:

```
<STATEMENT>    ::= BEGIN <STATEMENT>*END
               ::= FOR EACH <OBJECT> DO <STATEMENT>
               ::= IF <EXPRESSION> THEN <STATEMENT> { ELSE STATEMENT } ENDIF
               ::= <TOOL> ({<VARIABLE>,*})
               ::=REPORT >VARIABLE>

<EXPRESSION>   ::= <EXPRESSION> <B-OPERATOR> <EXPRESSION>
               ::= <VARIABLE> <R-OPERATOR> <VARIABLE>

<B-OPERATOR>   ::= AND | OR | NOT
<R-OPERATOR>   ::=<|>|<=|>=|=|!=
<VARIABLE>     ::=<NUMBER>|<STRING>|<OBJECT>
<TOOL>         ::=% [NAME, FUNCTION]
<OBJECT>       ::=@[NAME]
               ::=@[*{NAME}]

COMMENTS
    ||...
```

*Figure 4*

AUTOMATIC SYSTEM FOR DYNAMIC DIAGNOSIS AND REPAIR OF COMPUTER CONFIGURATIONS

FIELD OF INVENTION

This invention relates to a user support system for the analysis and correction of problems associated with computer user, and more particularly for a system to automatically diagnose and repair problems at the client side of a network.

REFERENCE TO MICROFICHE APPENDIX

The disclosure of the present invention includes a microfiche appendix. The total number of microfiche included in the appendix is 3. The total number of microfiche frames included in the appendix is 227.

BACKGROUND OF THE INVENTION

There are a number situations in which a user at the so called client's side of a network experiences difficulty with either the software or the hardware at his or her computer. Problems are varied, including peripherals which will not work with a given CPU, software which when loaded conflicts with other software running at the client's side, or in general problems with which the user is either unfamiliar or about which he has no expertise.

The level of frustration when first setting up a computer or local area network is oftentimes monumental, resulting in a large number of calls to the network administrator or to outside consultants. The problem is particularly severe with home users who in general do not have the skills either to diagnose a particular problem or to fix it. There is thus a class of users who are either corporate or home users, with the corporate users having at best qualified administrators to locally handle a given problem.

In order to analyze any problem the demographics of the local system, a task normally undertaken through the use of face to face meetings with consultants and clients, telephonic exchanges of information and at times exchanges of information over a network. Network-based solutions to problem solving have in the past included so called network administrator applications such as Intel's LANDesk, Unicenter TNG, Saber LAN and others, providing specialized services for particular hardware environments typically involving equipment provided by the company offering the service.

These services do not in general support a wide variety of equipment, differing networks, or a multiplicity of software applications or operating systems. As a result diagnosis and advice requires substantial verbal communication between support personnel and the user. The requirement for verbal interchange makes reliability of the repair suggestions suspect because it relies on the knowledge of the user or administrator for such information as disk capacity, hardware resource configuration, software versions, network characteristics and other information which is opaque to the user. Misinformation or lack of information results in inordinately long repair sessions also does not result in appropriate action to repair the problem. The frustration at this point can lead the user to return his equipment, or at the very least believe that the equipment or software is somehow faulty, whether or not this is true.

Typically a network administrator will discover a simple configuration problem on a machine that takes a few moments to fix. The network administrator now faces the task of spending a few moments on hundreds or thousands of machines to check for the problem configuration and resolve if necessary. For instance a new software package that is installed may overwrite a newer system file, and this system file will need to restored.

Moreover when a problem occurs at any given client site, due to the multiple operating platforms employed, a general solution is impossible with conventional means, eg. batch files to carry out repair operations. For instance, an operating system file necessary for proper operation may have been overwritten by an older version, such that the operating system is no longer functioning properly. A batch file could be written to update the system file, but this would require a custom solution for each operating platform.

There is thus a need for a system which is universal enough to accommodate a large variety of operating systems to diagnose and repair problems at the client side, in part by providing a common set of functions for diagnosis and repair operations.

SUMMARY OF THE INVENTION

In order to provide a universal system for diagnosis and repair of such problems a specialized script is provided which first makes an inventory of hardware, software and configuration information, which it gathers by querying local system services, hardware devices, disks, network connections, files and other information.

This information is then stored in an single uniform object oriented database called the system inventory along with a wide variety of system tools designed to permit correction of previously diagnosed problems. The system, upon receiving a request, accesses this inventory to look at any relevant data; and based on an evaluation of the relevant data calls up the appropriate tool. The tool is then used to automatically correct the problem either by installing new software, appropriate plugins or by changing the setting of hardware devices. Thus, as used herein the terms "system inventory" and "object oriented" database are synonymous.

As an adjunct to the subject script a log is kept on the client side, listing the operations performed. This is useful for the client in maintaining the security of the workstation. Thus a log is kept of what has been done and the results.

A further capability is that the network administrator can access the database to perform inventory management, creating a report of what hardware and software is installed and where.

Additionally, the use of the specialized script permits an administrator to repair all of the workstations having a similar problem without visiting them individually or first needing to verify that the problem exists.

As to the specialized script, the universality is primarily carried by the structure of the database. Different collection operations are undertaken on different platforms, but the data is presented in a manner which is consistent across all platforms. The structure involves a common format which can accommodate such diverse platforms as Windows NT, Macintosh, DOS, UNIX, and others.

For instance the format for describing drives consists of a collection of logical drive objects. Each drive object is a collection of attributes such as Drive Letter, File System, Free Space, Network Mapping, Partition Info, Size, Type, Volume Name and Volume Serial Number. This is applicable to any platform, although the information is gathered using completely different methods on each.

Further, for each of the objects for which there is a finite range of values, these values are defined and any object is mapped to one of these values. For instance, in terms of drive types there is a finite meaning: Fixed, RAM, Remote, Removable and CDROM. These are described in a different manner on different platforms, but are unified in the database.

As a feature of the subject invention, a scheduling algorithm is provided such that the script engine revisits the inventory to look for the problem configuration again, and repair it if necessary. This is done on a periodic basis to assure system integrity.

As a further feature, the subject system provides a support network making available a wide variety of timely and useful scripts. This support network acts as a central knowledge database, with scripts being written using information from various areas such as, but not limited to, Microsoft's knowledge base as available through Tech Net, internet newsgroups and log data from various system administrators can therefore, with little action, find scripts to repair and prevent problems on their own networks.

BRIEF DESCRIPTION OF THE DRAWINGS

These and other features of the Subject Invention will be better understood with reference to the Detailed Description taken in conjunction with the Drawings, of which:

FIG. 4 is a table illustrating one embodiment of the grammatical specification of a script language for use in evaluating the database of FIG. 1;

DETAILED DESCRIPTION

Figure 1:
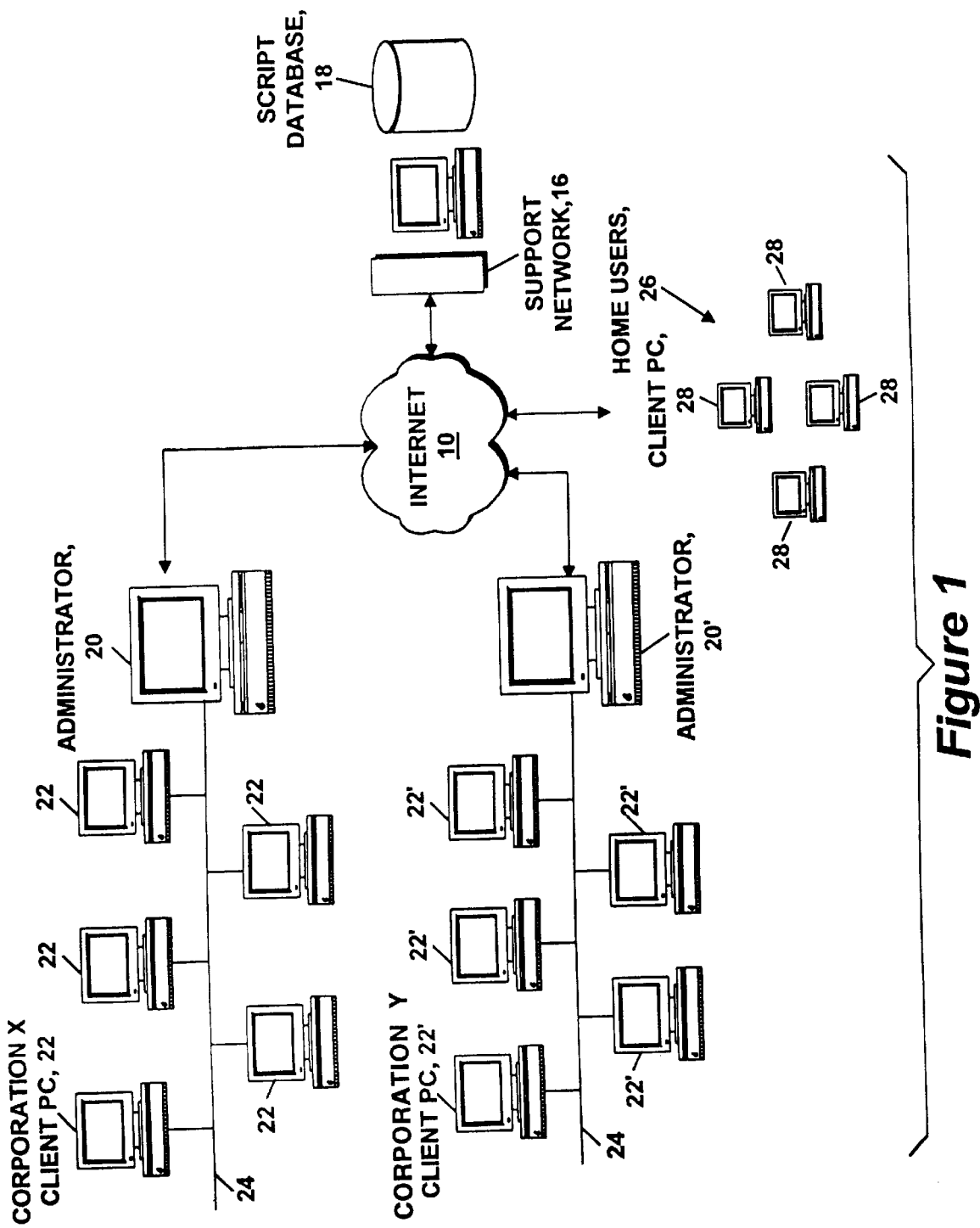
FIG. 1 is a diagrammatic representation of a number of clients connected via a network to a support facility housing the subject script and the script database by which automatic diagnosis and repair of a client computer can be effected.

Referring now to FIG. 1, in a typical application internet 10 couples client side 12 to server side 14 in which at the server side a support network 16 is coupled to a script database 18 for delivering a specialized script across the internet to the client side. In the illustrated embodiment an administrator 20 at Corporation X couples the downloaded script to associated terminals 22 connected to administrator 20 via local area network 24.

As will be discussed in connection with FIG. 2, each of the client terminals is provided with a script engine for processing the downloaded data and making the indicated changes so as to fix whatever problem has been diagnosed, either by the administrator or by the server side.

It will be appreciated that a script engine is to be previously installed at the terminals at the client side so as to be able to interpret repair and reconfiguration instruction transmitted from the server. This reconstruction and repair information is generated through the utilization of a large database which stores not only the infrastructure at the client side but also the tools necessary to change the client software for repair purposes. In general the tools are generic enough to be installed with the client software. As a need for new tools becomes apparent, these tools can be downloaded over the internet to the client side.

It is of course possible that a problem may be diagnosed by an administrator, along with a suggested solution. This information, in one embodiment, is transmitted to the server side where it is loaded into the script database. One of the features of the subject invention is that these new tools can be made available to others such as illustrated by the apparatus resident at Corporation Y in which an administrator 20' is coupled to terminals 22' by a local area network 24'. If each of the administrators has a subscription to the service, then patches devised by one administrator or at the server can be downloaded through the transmission of an appropriate script to all of the subscribers. These subscribers can also include home users 26 each having an associated terminal 28.

Figure 2:
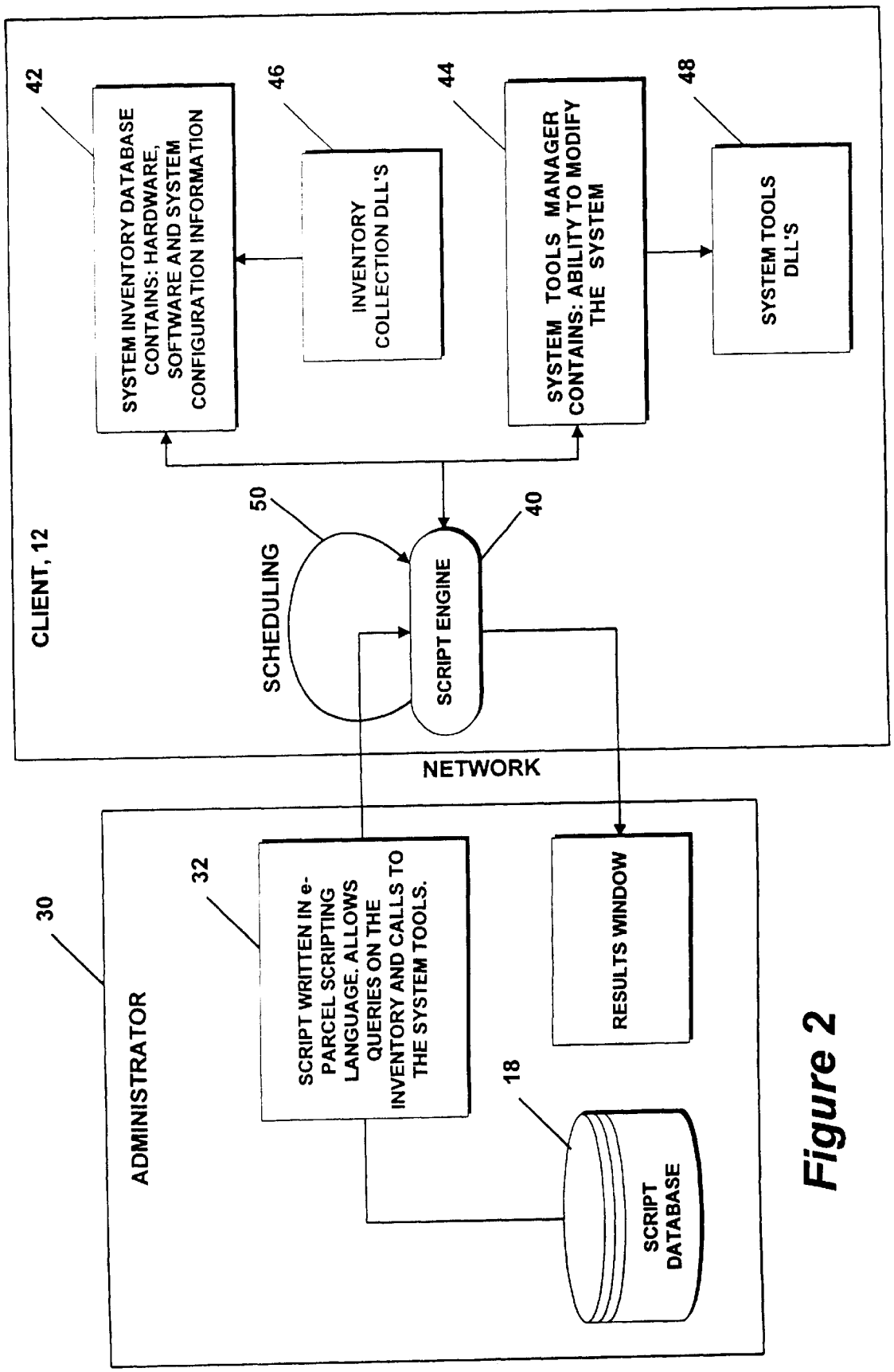
FIG. 2 is a diagrammatic representation of a portion of the system of FIG. 1 showing the use by an administrator of the specialized script which is transmitted by the network to a script engine operating at the client for processing calls to the database, evaluations of retrieved data and calls to the system tools.

Referring now to FIG. 2, at the server side an administrator 30 includes a script generator 32 which utilizes a specialized scripting language that allows queries on the inventory database and provides calls to the system tools, through accessing script database 18. The results of accessing the script database are transmitted to client 12 and the aforementioned script engine, here illustrated at 40. This script engine is in turn coupled to the client side system inventory database 42 and the system tools manager 44. An inventory collection module 46 is coupled to database 42 for transmitting executable files such as a dynamic link library or DLL. These collection libraries populate the database. As will be appreciated, database 42 contains hardware, software and system configuration information.

On the other hand the system tools manager 44 contains the ability to modify the system via accessing a system tool module 48 for providing access to tool modules. It will be appreciated that one can add as many modules as desired to accommodate a multiplicity of system tools.

As illustrated by the scheduling arrow 50, in one embodiment the scripts can be scheduled to periodically recheck for problem configurations and apply system tools as necessary.

Figure 3:
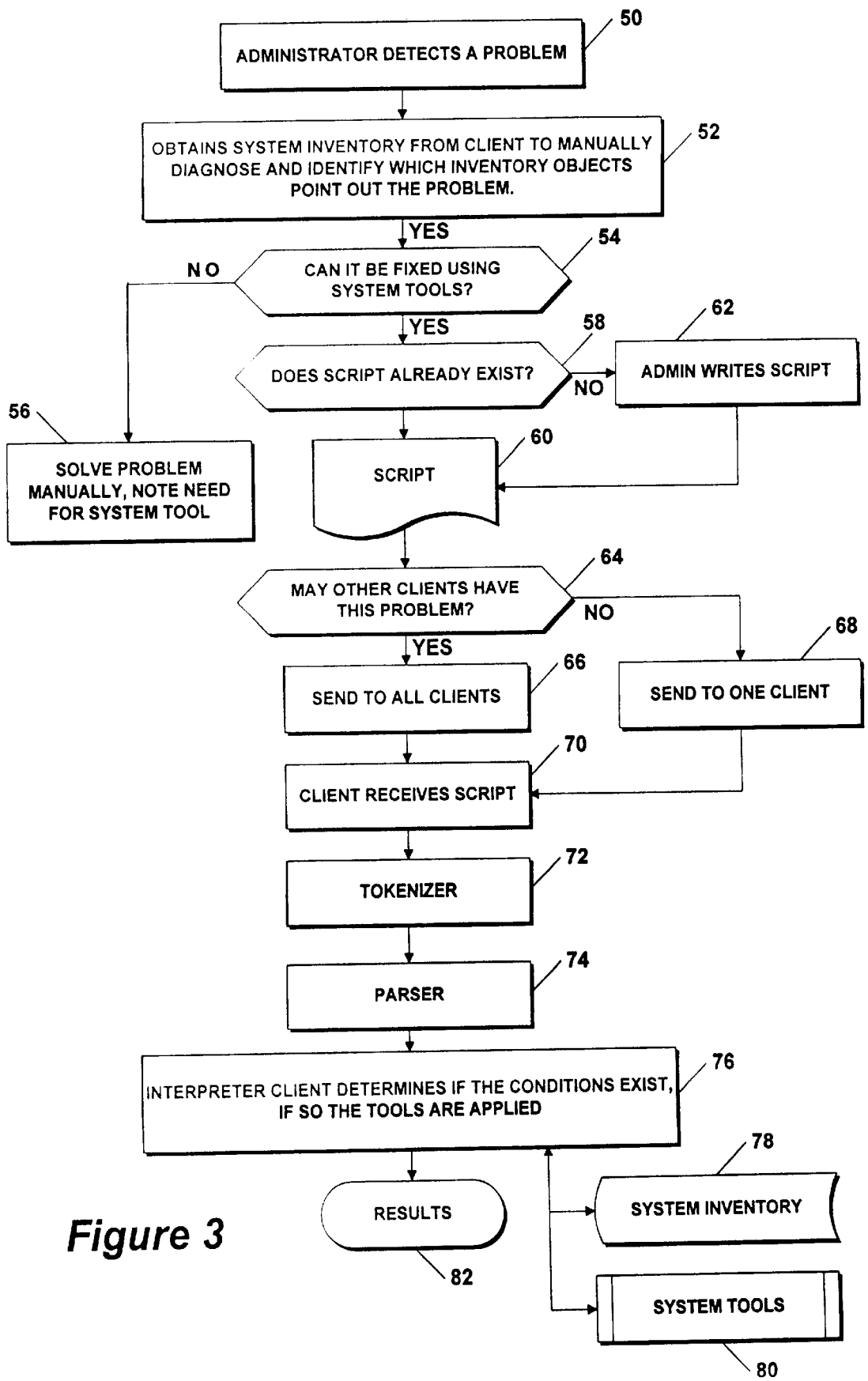
FIG. 3 is a flow chart illustrating the operation of the script engine at the client.

Referring now to FIG. 3, in one scenario in which an administrator detects a problem and determines a solution, as can be seen at 50, the administrator detects a problem and as illustrated at 52 obtains the system inventory from the client to manually diagnose and identify which inventory objects point out the problem. As illustrated at 54, a determination is made as to whether the problem can be fixed using the existing system tools. If not, as illustrated at 56 a note is made that the problem must be solved manually.

If the problem can be fixed using system tools, as illustrated at 58, a determination is made as to whether the script already exists. If so, script 60 is called; and if not the administrator writes the appropriate script as illustrated at 62. Thereafter a decision is made at 64 as to whether or not other clients may have the same problem. If so, as illustrated at 66, the script is sent to all clients; if not script 60 is sent to only one client as illustrated at 68.

At the client side as illustrated at 70, the client receives the script which is passed to a tokenizer 72 where the script is converted into tokens. Thereafter the tokenized script is parsed at 74 to build up a parse tree which is then interpreted at 76, with interpreter 76 executing the parse tree. This permits the generation of conditional expressions to do branches. This also permits accessing system inventory 78 and system tools 80 available to the client side to repair the problem, with the result as illustrated at 82 being the successful repair of the problem.

The universality of the script and the script engine derives from the way in which system information is stored in the system inventory, here illustrated at 78. Platform specific information is converted into a standard format and stored in an object oriented fashion in the system inventory. The data which the script is able to retrieve is presented in this standard format. The writer of the script can thus use this information to decide what to repair and provide the system tools with the necessary information.

Referring now to FIG. 4 the grammar for a particular script, in which statements, expressions, boolean operators, relational operators, variables, tools and objects are defined.

Figure 5:
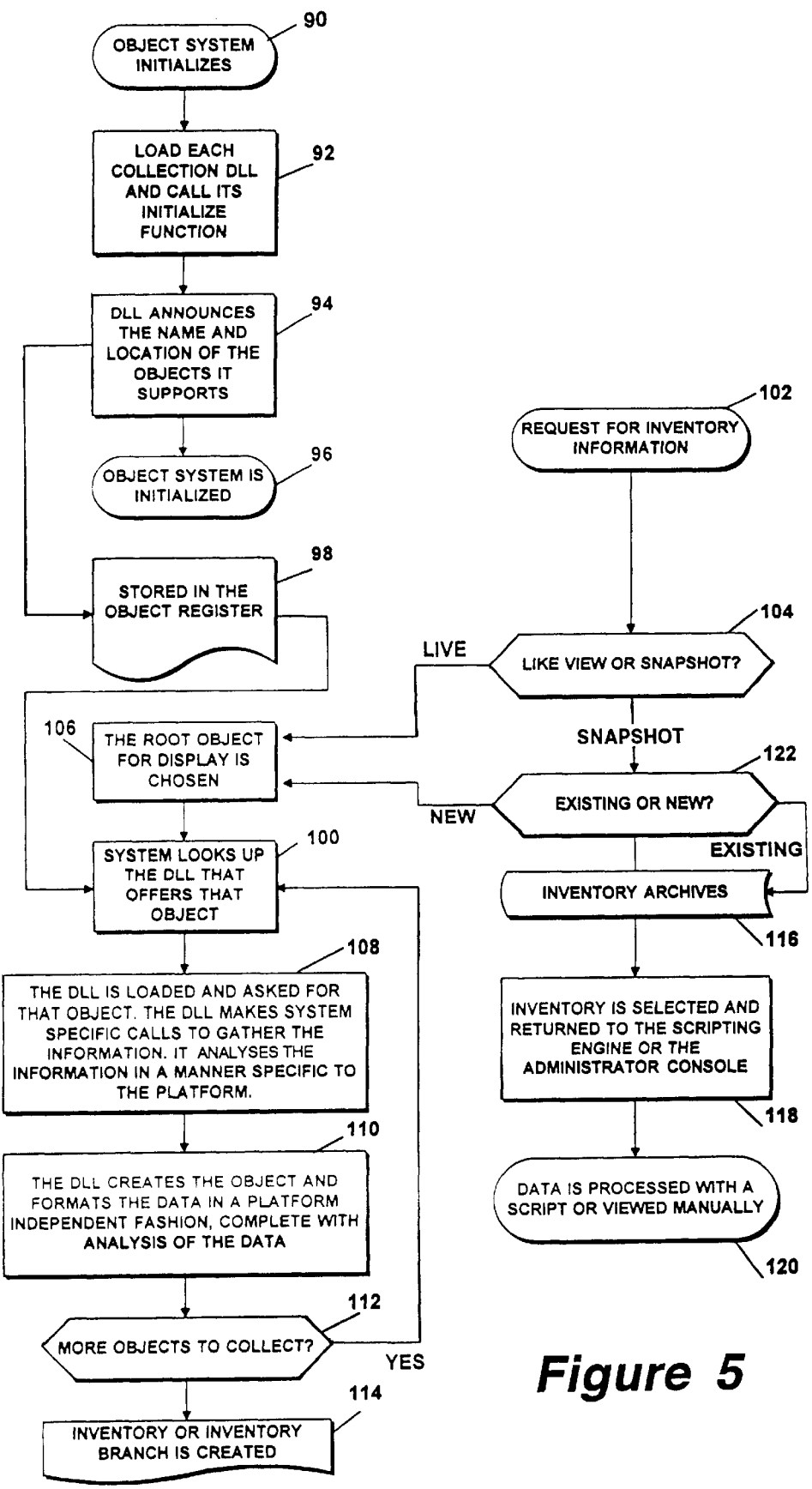
FIG. 5 is a flow chart showing object system initialization, a request for inventor information and further downstream procession to result in inventory selection and data processing; and, FIG. 6 is a flow chart for the architecture design of the subject system, showing the administrator's side and the client module.

Referring now to FIG. 5 a flowchart is illustrated which describes how the system inventory is populated. As illustrated at 90 object system initialization occurs. As illustrated at 92 each collection dynamic link library is identified and loaded and the initialization routine of the library is called. As illustrated at 94 the dynamic link library announces the name and location of objects it supports at which point the object system is initialized as illustrated at 96.

The results are stored in the object register 98 along with the dynamic link library that offers that object as illustrated at 100. As can be seen a request for inventory information is generated at 102 and a decision is made at 104 as to whether there shall be a live view or a snapshot. If it is to be a live view as illustrated at 106 the root object for display is chosen and coupled to block 100. The dynamic link library which can create this object is looked up at 100 and that dynamic link library is loaded at 108. The dynamic link library makes system specific calls necessary to gather the objects information, analyzes the data and stores it in the object in a standard format at 110. This object is stored in the system inventory. If there are more objects to create at 112 the process is repeated, other wise the inventory has been created 114. This inventory is then available 116 and returned to either the script engine in the case of a script engine request or the administrator in the case of a manual request 118. The data is processed or viewed 120.

Moreover, if a snapshot is selected at 104 a determination is made at 122 as to whether or not it exists and if it exists the snapshot is entered into inventory archives 116.

In summary, the result of the above is the creation or retrieval of a system inventory.

Figure 6:
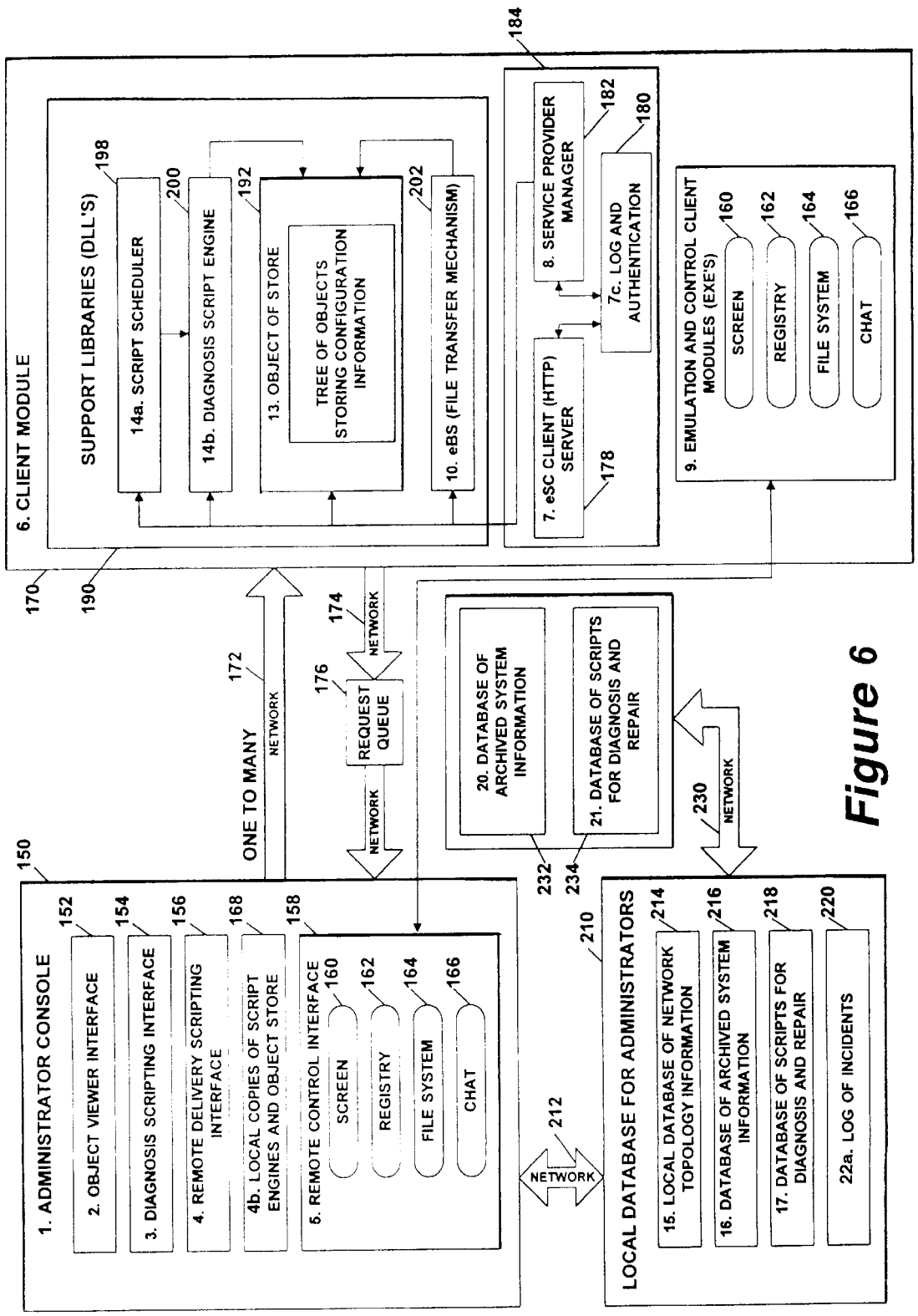

Referring now to FIG. 6, the architectural design for the subject system is described. As illustrated at the administrators console, here illustrated at 150, there is an object viewer interface 152, a diagnosis scripting interface 154, a remote delivery scripting interface 156, and a remote control interface 158 for remotely controlling screen 160, registry 162, file system 164 or chat function 166. Optionally as illustrated at 168 local copies of the script engine and system inventory framework are available.

Administrator 150 is connected to client 170 via a one to many network 172 in the direction of the client. A network 174 in direction of the administrator connects the client to the administrator via a request queue 176. At the client a module 178 performs the function of the server waiting for requests from administrator console 150. These requests are logged and authenticated at 180, with the output being provided to a service provider manager 182 all within client program 184 which is always running.

The service manager receives requests from the administrator console and routes them to the appropriate providers. As illustrated these providers include an emulation and control module 186 which includes screen 160, registry 162, file system 164, and chat function 166. Additionally service manager 182 accesses the support libraries 190 where the database 192, dynamic link libraries 194 and the tools 196 reside. Note that the service provider is coupled to a script scheduler 198 and a script engine 200 under the control of either script scheduler 198 or service manager 182 which is coupled to database 192. The output of service manager 182 is also coupled to a file transfer mechanism 202 which allows update of system components.

As shown, the administrator console is coupled to a local database 210 via a network 212 which stores network topology information 214 and which serves as a database of archived system information 216, a database 218 of scripts for diagnosis and repair and a log 220 of incidents.

The output of the local database is provided over a network 230 to support network 16 on the server side, thus to be able to access archived system information 232 and scripts 234 for diagnosis and repair.

In operation and in one example, the client application in the form of client program 184 is running on the client console. Using administrator console 150, a system administrator is able to take control of the client's computer using screen emulation 160, view the client's registry using 162, view the client's file system using 164 and communicate with the client operator using 166. This allows an administrator to manually view, configure or otherwise administer a client's computer. The administrator is also able to request system inventory 192 which collects its data utilizing support libraries 190. By viewing this inventory in object viewer interface 152 the administrator is able to find configuration problems. Using script interface 154, the administrator can create a script which is then dispatched to the client's script engine 200 where it then accesses system inventory 192 and system tools 196 to modify system configuration. Alternatively, the administrator, upon determining a problem, can request a script from support network script database 234 and send that to the client's computer where it is processed by script engine 200.

What is now presented is the format for each object inside the system inventory which is an object oriented database:

```
CLASS_EXPORT epBaseObject
{
public:
        virtual ~epBaseObject ( ) { }
        virtual void Release ( ) = 0;
        // persistance
        virtual void Stream ( epArchive&,ObjectFactory*) = 0;
// object insertion
virtual bool InsertObject ( epBaseObject* ) = 0;
// object enumeration
virtual bool GetFirstObjectPos      (epObjectPos&) = 0;
virtual bool GetNextObject      (epBaseObject**,
        epObjectPos& ) = 0;
virtual bool FindByType ( epString, epBaseObject**,
        epBaseObject* =NULL, bool /*reserved*/=false)= 0;
virtual bool FindByValue ( epString, epBaseObject**,
        epBaseObject* =NULL,bool/*reserved*/=false ) = 0;
virtual bool RecursiveFindByValue ( epString,
        epBaseObject**,   epBaseObject*   =NULL, bool
        /*reserved*/=false ) = 0;
virtual bool RecursiveFindByType ( epString,
        epBaseObject**,   epBaseObject*   =NULL, bool
        /*reserved*/=false ) = 0;
```

-continued

```
virtual bool Complete ( )        = 0;
virtual bool Endpoint ( )        = 0;
virtual bool LoadAlways ( ) { return false; }
// ui stuff
virtual bool GetIcon            (HICON& hIcon) = 0;
virtual bool GetSelectedIcon    ( HICON& hIcon ) = 0;
virtual bool GetOptionalViewer (REFCLSID,REFIID) = 0;
// run time information
virtual const epString& Type ( ) const = 0;
virtual       epString Type ( ) = 0;
virtual const epString& Value ( ) const = 0;
virtual       epString Value ( ) = 0;
virtual epVariant RawData ( ) = 0;
virtual epString RawValue ( ) = 0;
// providing our own new and delete
// due to bug listed in q122675
void* operator new         ( size_t tSize );
void operator delete       ( void* p );
virtual void SetType ( epString strType ) = 0;
virtual void SetType ( UINT ) = 0;
virtual void SetValue ( epString strValue) = 0;
virtual void SetValue ( UINT ) = 0;
virtual void SetIcon ( HICON hIcon ) = 0;
virtual void SetIcon (UINT, PCTSTR=RESOURCE_DLL ) = 0;
virtual void SetIcon ( HINSTANCE, UINT ) = 0;
virtual void SetSelectedIcon ( HICON hIcon ) = 0;
virtual void SetSelectedIcon (UINT,
      LPCTSTR=RESOURCE_DLL ) = 0;
      virtual void SetSelectedIcon ( HINSTANCE, UINT ) = 0;
      };
```

What will be appreciated here is that every single object has the same interface in the sense of how the object is accessed. For instance the interface entitled "object insertion" allows objects to be stored within an object, and later enumerated and accessed. As another example the "object enumeration" functions allow sequentially enumerating or searching by type or value as described below. As a result a wide variety of platforms can be supported.

For instance, numerical data representation varies from platform to platform. This object interface allows generic storage and retrieval of this data. On a DOS system numbers are stored in 16 bit data sizes. On UNIX this size is 32 bit, while on Windows NT this could be 32 bits or 64 bits. By using this interface these platforms are unified. This is because the data is retrieved using a Value and RawValue function which returns the data in a constant format where it can be converted to whatever format is applicable to the platform it is being utilized on. The difference between Value and RawValue lies in the fact that Value produces human readable formatting in a string, where RawValue presents only the data, again in a string.

What the above format shows is that for any object there are prescribed functions. Thus one can do whatever one wants within the object without regard to the platform. All that is necessary is to specify that it have the above interface.

The advantage of such a system is that it permits a system administrator to diagnose and repair a problem once and apply that repair in the form of a repair script to every computer on the network where the script would computer by computer make the decision whether a repair was necessary for each computer and apply that repair. In a typical situation the administrator would have to do this on an individual basis for each computer. Due to the diverse computer hardware and software configurations this would normally be an impossible task. However, these repairs are made possible in the subject system due to the standard format in which each individual computer's hardware and software configuration is stored and the standard interface of the tools. Further, the support network allows administrator knowledge to be centralized in the form of a repair script database gathered from the information associated with many different sources. This provides administrators with the ability to download repair scripts from the support network and send them to the computers on their local network, where again the script at each computer makes the decision of whether or not a repair is necessary and applies that repair only when necessary. Further, as indicated by FIG. 6, manual tools are also provided for situations for which no repair script is available.

A program listing in C++ is provided in the appendix hereto which further describes the subject dynamic diagnosis and repair system.

Having above indicated several embodiments of the Subject Invention it will occur to those skilled in the art that modifications and alternatives can be practiced within the spirit of the invention. It is accordingly intended to define the scope of the invention only as indicated in the following claims.

We claim:

1. An automatic system for dynamic diagnosis and repair of a user's computer which is coupled via a network to a server, comprising:

an object oriented database for storing an inventory of hardware, software and configuration information relative to said user's computer and said network in a standard format regardless of which of a plurality of different operating systems is associated with said user's computer; and, a programmable interface capable of processing a script for accessing and using data from said object oriented database for diagnosing a predetermined problem with said user's computer and for repair thereof, said script being universal to said plurality of different operating systems, whereby the user's computer may be diagnosed and repaired by said script regardless of the operating system used.

2. The system of claim 1, wherein said script is initially loaded into said user's computer for processing by said programmable interface to effectuate the repair of said user's computer.

3. The system of claim 2 and further including means for repetitiously scheduling said programmable interface to access said object oriented database.

4. The system of claim 1, wherein said object oriented database is at said server.

5. The system of claim 1, wherein said programmable interface is within said user's computer.

6. The system of claim 1, further comprising a support network in which a plurality of scripts are stored, thereby preventing a system administrator or home user from having to create said script.

7. The system of claim 1, wherein said object oriented database is at said user's computer.

8. A system for dynamic diagnosis and repair of a client computer which is coupled via a network to a server, comprising:

(a) a system inventory object oriented database in which data indicative of hardware and software associated with the client computer is stored in a standard format regardless of which of a plurality of operating systems is associated with said client computer; and (b) a script engine for processing a script which is universal to said plurality of operating systems and which utilizes said data in order to make changes to said client computer necessary to solve a problem with said client computer regardless of which of said plurality of operating systems is associated with said client computer.

9. The system of claim 8 wherein said script engine is further provided for processing said script in order to determine if a problem exists with said client computer prior to making changes to said client computer necessary to solve a problem determined to exist with said client computer.

10. The system of claim 8 wherein said system inventory object oriented database contains current data indicative of hardware and software currently associated with the client computer and archived data indicative of hardware and software previously associated with said client computer.

11. The system of claim 10 wherein said script utilizes said current data and said archived data.

12. The system of claim 8 wherein said system inventory object oriented database is located at said client computer.

13. The system of claim 8 wherein said system inventory object oriented database is located at said server.

14. The system of claim 8 further comprising a script database for storing a plurality of scripts.

15. A method comprising the steps of:

converting platform specific data indicative of hardware and software associated with a client computer which is coupled to a server via a network into a standard format regardless of which of a plurality of operating systems is associated with said client computer;

storing the standard format data in an inventory database; and processing a script for accessing and using data from said inventory database to diagnose a predetermined problem with said client computer, wherein said script is capable of diagnosing said predetermined problem regardless of which of a plurality of different operating systems is associated with said client computer.

16. The method of claim 15 wherein the data storing step includes the step of providing the inventory database in the form of an object oriented database.

17. The method of claim 16 wherein said querying step is performed by a system administrator.

18. The method of claim 16 wherein said querying step comprises the step of processing of a script with a script engine.

19. The method of claim 18 wherein said querying step is used for purposes of inventory management, upgrade planning, and problem resolution.

* * * * *

UNITED STATES PATENT AND TRADEMARK OFFICE
CERTIFICATE OF CORRECTION

PATENT NO.    : 6,170,065 B1
DATED         : January 2, 2001
INVENTOR(S)   : Kobata et al.

It is certified that error appears in the above-identified patent and that said Letters Patent is hereby corrected as shown below:

Column 1,
Line 20, insert -- of -- after "number".

Column 2,
Line 5, insert -- be -- after "to".
Line 28, delete "an" and replace with -- a --.

Column 3,
Line 67, delete "interpret repair and reconfiguration" and replace with -- interpret, repair and reconfigure --.

Column 5,
Line 39, delete "other wise" and replace with -- otherwise --.

Signed and Sealed this

Twelfth Day of March, 2002

*Attest:*

*Attesting Officer*

JAMES E. ROGAN
*Director of the United States Patent and Trademark Office*